United States Patent
Altman

[11] 3,989,356
[45] *Nov. 2, 1976

[54] PHOTOGRAPHIC PRODUCTS FOR DIRECT OBSERVATION AND OPTICAL PROJECTION, AND PHOTOGRAPHIC PROCESSES FOR THEIR PRODUCTION AND UTILIZATION, PHOTOGRAPHIC DEVICES FOR USE THEREWITH

[76] Inventor: Gerald Altman, 41 Westminster Road, Newton, Mass. 02159

[*] Notice: The portion of the term of this patent subsequent to Apr. 9, 1991, has been disclaimed.

[22] Filed: May 9, 1974

[21] Appl. No.: 468,441

Related U.S. Application Data

[63] Continuation-in-part of Ser. No. 446,274, Feb. 27, 1974, abandoned, which is a continuation-in-part of Ser. No. 225,187, Feb. 10, 1972, Pat. No. 3,802,884, which is a continuation of Ser. No. 734,039, June 3, 1968, abandoned, which is a continuation-in-part of Ser. No. 655,714, July 6, 1967, abandoned.

[52] U.S. Cl. .......................................... 350/160 LC
[51] Int. Cl.² ............................................. G02F 1/13
[58] Field of Search ............................. 350/160 LC

[56] References Cited
UNITED STATES PATENTS

| | | |
|---|---|---|
| 3,650,603 | 3/1972 | Heilmeier et al. ............. 350/160 LC |
| 3,700,306 | 10/1972 | Cartmell et al. ............. 350/160 LC X |
| 3,703,331 | 11/1972 | Goldmacher et al. ........ 350/160 LC |
| 3,722,998 | 3/1973 | Morse ......................... 350/160 R X |
| 3,756,694 | 9/1973 | Soref et al. .................. 350/160 LC |
| 3,824,008 | 7/1974 | Smith ......................... 350/160 LC X |

OTHER PUBLICATIONS

Soref, "Thermo–Optic Effects in Nematic–Cholesteric Mixtures," J. Appl. Phys., vol. 41, No. 7, pp. 3022-3026, June 1970.

*Primary Examiner*—John K. Corbin
*Assistant Examiner*—Matthew W. Koren
*Attorney, Agent, or Firm*—Morse, Altman, Oates & Bello

[57] ABSTRACT

A visual presentation sheet is provided with a photographic image stratum and a liquid crystal stratum. Under certain energy conditions, the liquid crystal stratum scatters incident light so that the photographic image stratum is visible by direct observation. Under other energy conditions, the liquid crystal stratum is cleared to enable optical projection of the photographic image stratum.

48 Claims, 7 Drawing Figures

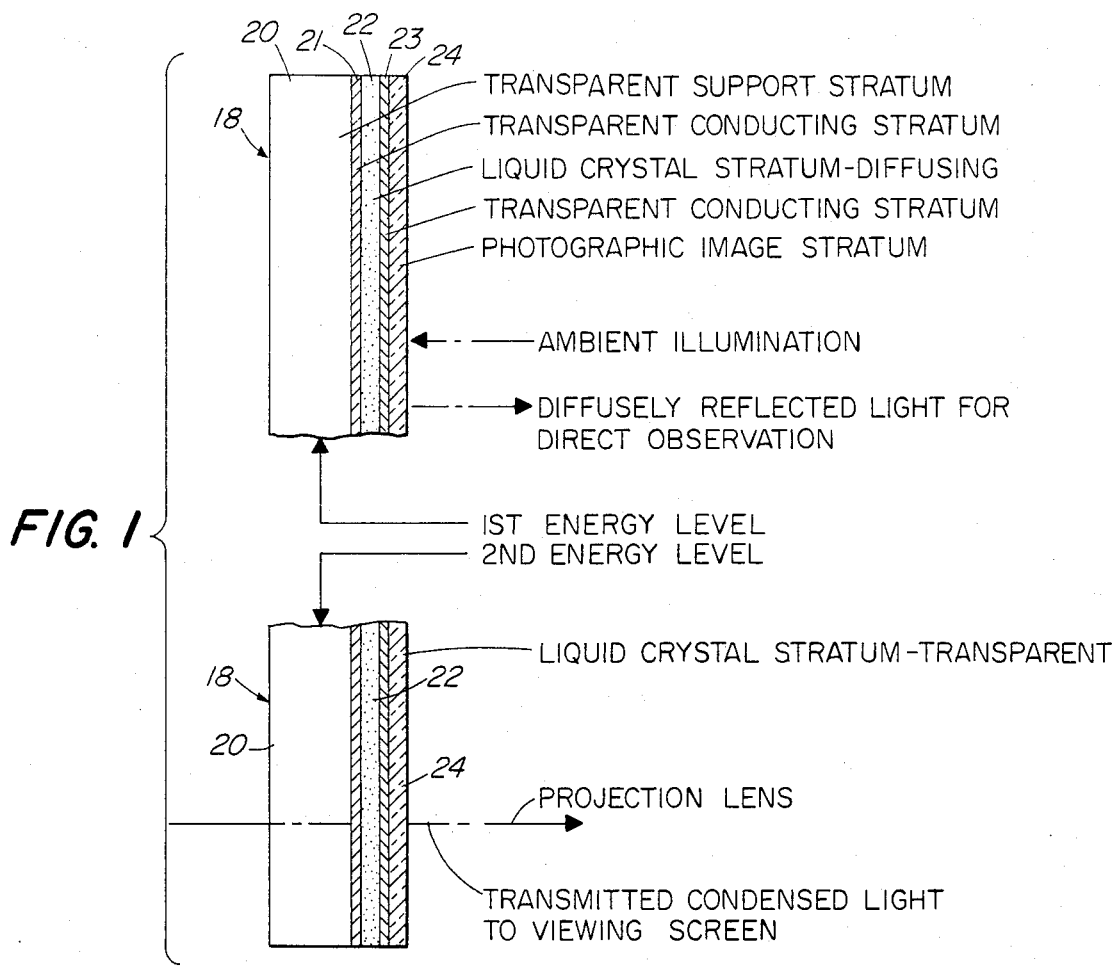
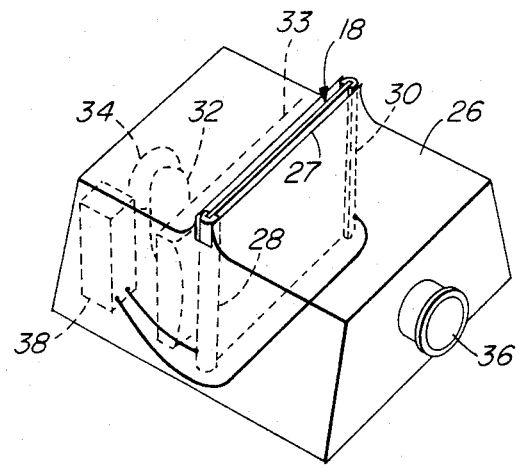

PHOTOGRAPHIC PRODUCTS FOR DIRECT OBSERVATION AND OPTICAL PROJECTION, AND PHOTOGRAPHIC PROCESSES FOR THEIR PRODUCTION AND UTILIZATION, PHOTOGRAPHIC DEVICES FOR USE THEREWITH

RELATED APPLICATIONS

This application is a continuation-in-part of copending application Ser. No. 446,274, now abandoned filed Feb. 27, 1974, which in turn is a continuation-in-part of copending application Ser. No. 225,187, filed Feb. 10, 1972 (now Pat. No. 3,802,884, issued Apr. 9, 1974), which in turn is a continuation of copending application Ser. No. 734,039, filed June 3, 1968 (now abandoned), which in turn is a continuation-in-part of copending application Ser. No. 655,714, filed July 6, 1967 (now abandoned). This application also is related to application Ser. No. 747,339, filed July 24, 1968 (now U.S. Pat. No. 3,525,566, issued Aug. 25, 1970), which is a continuation-in-part of aforementioned application Ser. No. 655,714, filed July 6, 1967 (now abandoned).

BACKGROUND AND SUMMARY OF THE INVENTION

The present invention relates to image presentation and, more particularly, to devices, processes and products involving photographic images that are adapted for both direct observation and optical projection. Conventionally, a photographic presentation that is intended for direct observation is associated with a diffuse reflecting distribution, by which imaging light is returned to an observer's eyes. Conventionally, a photographic presentation that is intended for optical projection is associated with a transparent support, by which condensed light is directed through the photographic image toward a viewing screen. Under various circumstances, it is desired that a single presentation permit both direct observation and optical projection.

The primary object of the present invention is the provision of photographic devices, processes and products involving a photographic image stratum for visual display and a liquid crystal stratum having a diffuse reflective phase or texture by which the image may be observed directly and a clear transparent phase or texture by which the image may be projected. Generally, diffusely reflecting materials provide a myriad of refracting discontinuities, which, in one form, are defined by the surfaces of minute transparent crystal domains that scatter incident rays of light at random by both external and internal reflection. On the other hand, transparent materials are amorphic in the sense that they have no such refracting discontinuities with respect to visible light. Liquid crystal materials can exhibit either a presence or an absence of refracting discontinuities depending on energy level. The contemplated combination of photographic image and liquid crystal, in one form, is mounted on a clear base that permits diascopic projection. In another form, the combination is mounted on a metallic reflecting base, which is obscured by the liquid crystal when the image is observed directly but which serves as a specular backing for episcopic projection when the liquid crystal is clear.

Other objects of the present invention will in part be obvious and will in part appear hereinafter.

The invention accordingly comprises the devices, processes and products having the components, steps and interrleationships which are presented in the accompanying disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein:

FIG. 1 illustrates, in exaggerated cross section, the structure and operation of a photographic product that is adapted for both direct observation and diascopic projection;

FIG. 2 illustrates a projection device adapted for use with the product of FIG. 1;

DETAILED DESCRIPTION

Introductory Considerations

Figure 3:
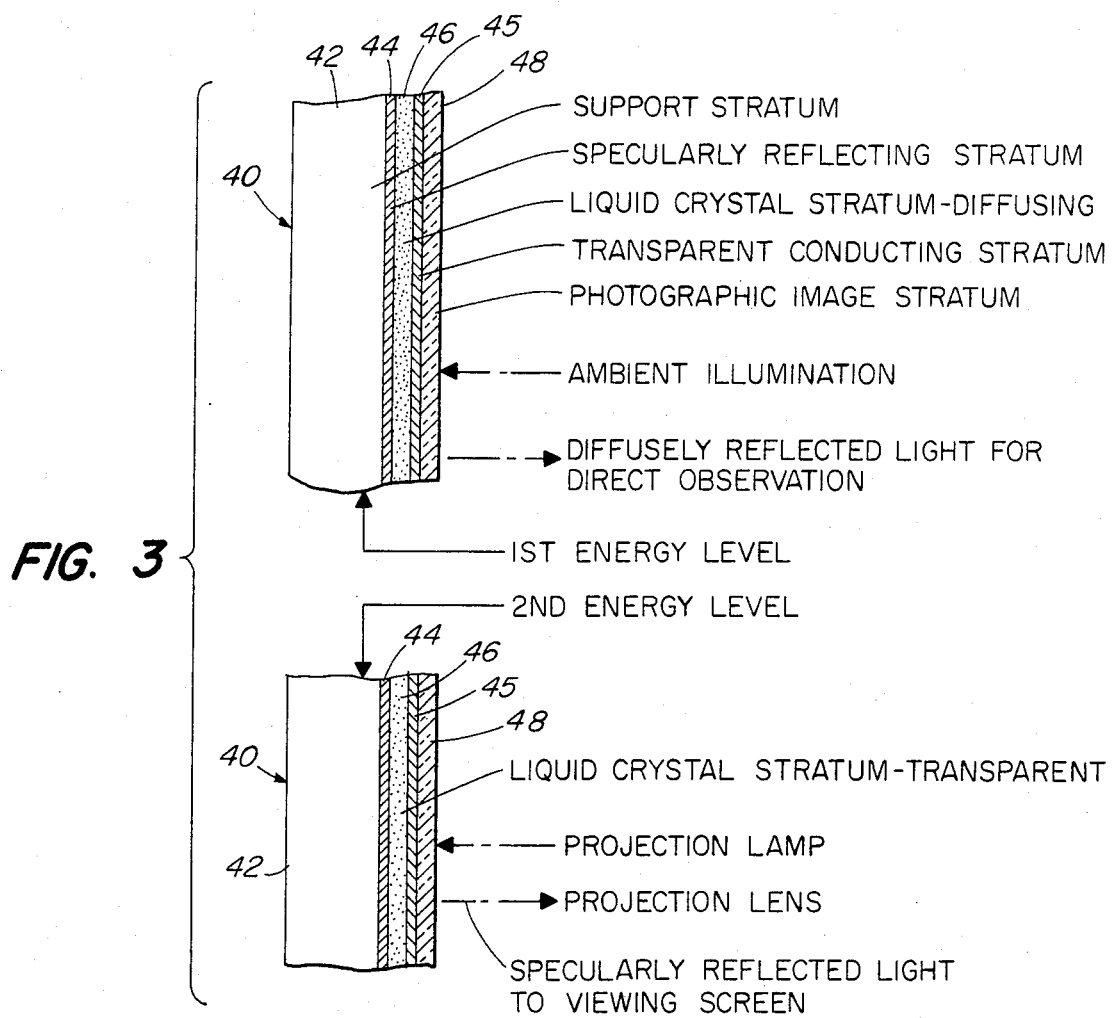
FIG. 3 illustrates, in exaggerated cross section, the structure and operation of another photographic product that is adapted for both direct observation and episcopic projection.

Generally, each of the products disclosed specifically herein is in the form of an integrated sheet comprising an assemblage of contiguous photographic image and liquid crystal strata. The photographic image stratum per se is composed of any of a great variety of photosensitive materials or materials produced from exposed and developed photosensitive materials, some of which are described specifically below. The liquid crystal stratum per se is composed of a material characterized by a scattering or crystalline phase or texture having minute refracting discontinuities on one side of a critical condition, i.e. thermally or electrically imparted energy level, and a transparent or amorphic phase or texture having a refracting continuum on the other side of this critical condition. For the broad purposes of the present invention, the specific chemical composition of the liquid crystal is immaterial, the present requirement being merely a selectivity between what may be characterized as crystalline and amorphic phases or states from the optical standpoints of scattering and transparency as a function of applied energy.

The Processes And Products Of FIG. 1

In FIG. 1, photographic print 18 comprises, in laminated sequence, a transparent base stratum 20, a transparent electrically conducting stratum 21, a liquid crystal startum 22, a transparent electrically conducting stratum 23, and a photographic image stratum 24. This photographic image stratum is capable of having or has continuous tone, being characterized by the usual characteristic (H and D) curve (density plotted against log exposure) with transverse upper and lower extreme portions that are outwardly and oppositely directed and a generally oblique intermediate portion, the slope of which is designated by gamma. Preferably, base stratum 20 is composed of a transparent plastic, for example, a cellulosic polymer such as cellulose nitrate, cellulose propionate or cellulose butyrate, or a polyester such as polyethylene terephthalate.

Generally, liquid crystal stratum is composed of one or more organic materials selected from the class consisting of smectic, nematic and cholesteric compounds. A variety of such materials are described in: G. W. Gray, "Molecular Structure And The Properties of Liquid Crystals," Academic Press, NY (1962); J. F. Johnson and R. S. Porter, "Liquid Crystals And Ordered Fluids," Plenum Press, NY (1970); and G. H. Brown, J. W. Doane and V. D. Neff, "A Review Of The Structure And Physical Properties Of Liquid Crystals," CRC Press, Cleveland, Ohio (1971). Such materials may be considered to have a microcrystalline state at which they are characterized by inhomogeneous refraction and an amorphic state at which they are characterized by homogeneous refraction. In one form, the liquid crystal stratum contains an electrically responsive mixture of smectic, nematic and cholestric compounds. Generally such a mixture is switched between scattering and transparent states at room temperature with respect to visible light by selective application of DC and/or AC fields, each typically ranging from 1 to 500 volts. More specifically, a mixture of nematic and cholesteric materials is particularly advantageous. One such mixture contains, by total weight, approximately 80% of a dielectrically negative nematic material, for example, an anil compound such as N-(p-methoxybenzylidene)-p-butylaniline, and approximately 20% of a cholesteric material, for example, a cholesteryl compound such as cholesteryl oleyl carbonate or cholesteryl erucate. A thin stratum of this mixture, at or about room temperature, assumes a persisting focal conic cholesteric texture characterized by optical static scattering when subjected to direct current or low frequency alternating current (less than 100 Hertz) and assumes a persisting Grandjean cholesteric texture characterized by optical clarity when subjected to a high frequency alternating current (greater than 500 Hertz). See W. Haas, J. Adams, and J. B. Flannery, *ac-Field Induced Grandjean Plane Texture In Mixtures Of Room-Temperature Nematics And Cholesterics*, "Physical Review Letters," Vol. 24, No. 11, Mar. 16, 1970. Another such mixture contains, by total weight, from 5 to 80% of a cholesteric material, for example, an asymetric, optically active, p-alkoxybenzylidene-p'-amino-benzonitrile compound, and from 95 to 20% of a nematic material having positive dielectric anisotropy such as an alkoxy- or an acyloxybenzylidene anil. A ¼ to ½ mil stratum of this mixture, at or about room temperature, normally in the cholesteric phase characterized by static optical scattering, assumes a nematic phase characterized by optical clarity when subjected to a direct or alternating (approximately 60 Hertz) current of approximately 30 to 60 volts, and reverts to the original cholesteric phase when the electrical field is removed. See U.S. Pat. No. 3,792,915, Feb. 19, 1974, Chan Soo Oh and Edward F. Pasierb, Novel Liquid Crystal Electro-Optic Devices. In another form, the liquid crystal stratum contains: a thermotropic microcrystalline aliphatic, for example, a hydrocarbon wax such as paraffin; or a lyotropic, amphiphile, for example, a fatty acid salt such as sodium stearate. Such a material is switched between a scattering phase at room temperature and a transparent phase at an elevated temperature, typically ranging between 40° and 200° F. above room temperature.

Photographic image stratum 24 generally is composed of a photosensitive material or a material produced from an exposed and developed photosensitive material. In one such photographic material, one or more of the silver halides, of which silver chloride, silver bromide and silver iodide are examples, are dispersed in a suitable colloidal material, such as gelatine, agar, albumin, casein, collodion or cellulosic ester. In use, this stratum initially is photosensitive and, after photoexposure to provide a latent image, is developed by silver reduction and fixed by silver halide dissolution in an alkaline environment. The developer generally is alkali active, i.e. active only in alkaline solution. Examples of developers of this type are pyrogallol, hydroquinone, metol, amidol, para-aminophenol and glycin. The fixing agent, for example, is a silver halide solvent such as sodium thiosulfate or sodium thiocyanate. The alkali, for example, is an alkali metal or nitrogenous base such as sodium hydroxide or hydroxylamine. Alternatively, the photographic image stratum is or is produced from other photosensitive materials, for example: a ferric compostion capable of being developed by potassium ferrocyanide; a diazo material capable of being developed by an alkali; a bichromated material capable of being differentially hardened and dyed; a photopolymerizable material capable of being differentially polymerized by incident light as in U.S. Pat. No. 2,948,611, issued on Aug. 9, 1960, in the name of Arthur L. Barney for Photopolymerizable Composition, Elements and Processes; a photothermographic material capable of being developed by heat as in U.S. Pat. No. 2,095,839, issued on Oct. 12, 1937, in the name of Samuel E. Sheppard et al, for Photothermographic Composition; a phototropic material capable of being differentially darkened by light without development as in U.S. Pat. No. 2,953,454, issued on Sept. 20, 1960, in the name of Elliot Berman for Phototropic Data Storage Capsules and Base Coated Therewith; or a photoconductive material, which assumes a differential charge pattern on exposure, is developed by differential electrostatic attraction of pigmented particles, and is fixed by heat. In another alternative embodiment, of the present invention, the photographic stratum is developed and fixed by a so-called diffusion transfer reversal process of the type disclosed in U.S. Pat. No. 2,543,181, issued on Feb. 27, 1951, in the name of Edwin H. Land for Photographic Product Comprising A Rupturable Container Carrying a Photographic Processing Liquid. In accordance therewith, development is effected by spreading an aqueous alkaline solution of a silver halide developer and a silver halide solvent in contact with a photoexposed, photosensitive stratum and a receiving stratum. Silver is developed in the photosensitive stratum and a silver halide complex, formed at the photosensitive stratum, migrates to the receiving stratum to produce an image. Other such processes are disclosed in U.S. Pat. No. 2,997,390, issued Aug. 22, 1961, in the name of E. H. Land for Novel Color Processes and Products and in U.S. Pat. No. 3,007,400, issued Feb. 12, 1963, in the name of H. G. Rogers et al, for Color Diffusion Transfer Using Gelatino Silver Halide Emulsions Containing Cellulose Ethers.

Preferably, each of electrically conducting strata 21, 23 is composed of a vapor deposited metal, particularly a vapor deposited noble metal sch as gold or silver, having a thickness ranging from 50 to 300 angstrom units. As shown, electrically conducting stratum 21 is vapor deposited on support stratum 20 and electrically conducting stratum 23 is vapor deposited on photographic stratum 24.

The System of FIG. 2

The projector of FIG. 2, includes a unitary housing 26 having a forward portion and a rearward portion that are medially separated by a projection gate 27. Photographic print 18 is removably inserted into projection gate 27 through an upper notch in housing 26. The operating components of the projector include a high intensity projection lamp 32 having a point incandescent source for generating visible illumination, a concave mirror 34 behind the point source, an aspheric condensing lens 33 between the point source and the projection gate, and a projection lens 36. At the edges of projection gate 27 are a pair of electrically conducting channels 28, 30, which constrain print 18 as it is inserted into and removed from gate 27. Channels 28, 30 respectively contact conducting strata 21, 23 in a manner to be described in connection with FIG. 5. These electrically conducting strata are energized through suitable leads by a power supply and circuit control 38.

Specific structure and operation of the products and devices of FIGS. 1 and 2 are given in the following non-limiting examples.

EXAMPLE 1

In one example of photographic print 18 of FIG. 1 as used in the projector of FIG. 2: support stratum 20 is composed of plastic approximately 0.002 inch thick; liquid crystal stratum, approximately 0.001 inch thick, is composed of a mixture, by total weight, of (1) 20% of oleyl cholesteryl carbonate and (2) 80% of anisylidene-p-n-butylaniline; each of conducting strata 21, 23 is composed of silver approximately 100 angstrom units thick; and photographic image stratum 24, which includes a support stratum approximately 0.002 inch thick and an image stratum approximately 0.001 inch thick, initially contains photosensitive gelatino silver halide emulsion and, after exposure, development and fixing, a differentially deposited silver image. After print 18 is inserted into gate 27, a 200 volt-500 hertz AC field applied across electrodes 28, 30 causes liquid crystal stratum 22 to clear and print 18 to become a transparency. As a result, illumination is projected from lamp 32, mirror 34 and condensing lens 33 through gate 27 and projection lens 36 to a viewing screen. On the other hand, before the print is removed from gate 27, a 100 volt DC field applied across electrodes 28, 30 causes liquid stratum 22 to cloud. As a result, when the print is removed from the gate, photographic image stratum 24 is viewed directly in light that is diffusely reflected by liquid stratum 22.

EXAMPLE 2

In another example of photographic print 18 of FIG. 1 as used in the projector of FIG. 2: support stratum 20, electrically conducting strata 21, 23 and photographic image stratum 24 correspond to their counterparts isn Example 1. However, liquid crystal stratum 22 contains a mixture of p-alkoxybenzylidene-p'-aminobenzonitrile and an alkoxy anil. Such a mixture is a diffuse white at room temperaure so that, ordinarily, photographic image stratum 24 is viewed directly in light that is diffusely reflected by liquid stratum 22. In this embodiment, application of about 30–60 volts AC, across electrodes 28, 30 and conducting strata 21, 23 causes liquid crystal stratum 22 to clear so that when print 18 is inserted into gate 27, print becomes a transparency. As a result, illuminating light is projected from lamp 32, mirror 34 and condensing lens 33 through gate 27 and projection lens 36 to a viewing screen. When print 18 is removed from gate 27, liquid crystal stratum 22 reverts to its scattering state so that print 18 once again can be viewed by diffusely reflected light.

The Process And Products Of FIG. 3

In FIG. 3, photographic print 40 comprises, in laminated sequence, a base stratum 42, a vapor deposited aluminum stratum 44, a liquid crystal stratum 46, a vapor deposited electrically conducting stratum 45 and a photographic image stratum 48. As shown, base stratum 42, liquid crystal stratum 46, electrically conducting stratum 45 and photographic stratum 48 of FIG. 3 are analogous respectively to base stratum 20, liquid crystal stratum 22, electrically conducting stratum 23 and photographic stratum 24 of FIG. 1. Interposed between base stratum 42 and liquid crystal stratum 46 is a vapor deposited aluminum stratum 44, which typically ranges in thickness between 500 and 1500 angstrom units. At a first energy level, liquid crystal stratum 46 is optically diffuse so that ambient illumination enables direct observation of photographic image stratum 48 by diffusely reflected light. At a second energy level, liquid crystal stratum 46 is transparent so that condensed illuminating light from a projection lamp through photographic stratum 48 and liquid crystal stratum 46 to specularly reflecting stratum 44 is returned as imaging light through liquid crystal stratum 46 and photographic stratum 48 for projection to a viewing screen.

Figure 4:
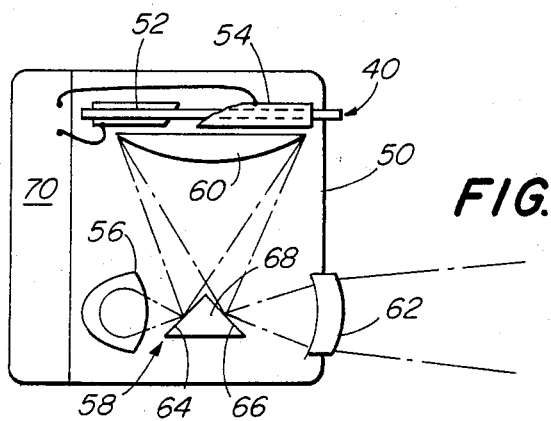
FIG. 4 illustrates a projection device adapted for use with the product of FIG. 3.

The System Of FIG. 4

The projector of FIG. 4 is designed for photographic print 40 of FIG. 3. This projector includes a unitary housing 50, within which the operating components are mounted and enclosed. Photographic print 40 is inserted and removed through a notch at the side of the projector into a projection gate, which is defined between a lower electrically conducting channel 52 and an upper electrically conducting channel 54. Lower electrode 52 and upper electrode 54 constrain print 40 as it is inserted into and removed from the projection gate. These electrodes respectively contact aluminum stratum 44 and conducting stratum 45, which therefore are energized by a power supply 70 that is analogous to power supply 38. As shown, converging illuminating light from a high intensity, point source lamp 56 is reflected by a first oblique mirror 64 as diverging illuminating light to a field lens 60. Next field lens 60, which is substantially as great in lateral extend as print 40, directs parallel illuminating light into the projection gate containing photographic print 40. In print 40, parallel imaging light from reflecting stratum 44 is returned through liquid crystal stratum 46 and photographic image stratum 48 to field lens 60. Next converging imaging light from field lens 60 is directed to a second oblique mirror 66 wich reflects diverging imaging light to an objective lens 62 for projection onto a viewing screen. The arrangement is such that a first image of the lamp filament is located at mirror 64 and a second image of the lamp filament is located at mirror 66, the first image being formed by the condensing mirror of lamp 56 and the second image being formed by field lens 60.

Specific structure and operation of the products and devices of FIGS. 3 and 4 are given in the following non-limiting examples.

EXAMPLE 3

In one example of photographic print 40 of FIG. 3 as used in the projector of FIG. 4, support stratum 42, liquid crystal stratum 46, transparent conducting stratum 45 and photographic image stratum 48 correspond respectively to support stratum 20, liquid crystal stratum 22, electrically conducting stratum 23 and photographic image stratum 24 of Example 1. Vapor deposited aluminum stratum 44 is approximately 1200 angstrom units thick. After print 40 is inserted into the gate, a 200 volt-500 hertz AC field is applied across electrode 52 and electrode 54 to cause liquid crystal stratum 46 to clear and to back photographic image stratum 48 optically by specular reflecting stratum 44. As a result, illuminating light is directed from lamp 56 via mirror 64 and field lens 60 to photographic print 40 in the projection gate and imaging light is reflected from photographic print 40 in the projection gate via field lens 60 and mirror 66 through objective lens 62 to a viewing screen. On the other hand, before the print is removed from the projection gate, a 100 volt DC field applied across electorde 52 and electrode 54 causes liquid stratum 46 to cloud. As a result, when the print is removed from the gate, photographic image 48 is viewed directly in light that is diffusely reflected by liquid crystal stratum 46.

EXAMPLE 4

In another example of photographic print 40 of FIG. 3 as used in the projector of FIG. 4, support stratum 40, specular reflecting stratum 44 and photographic stratum 48 correspond to their counterparts in Example 3. Conducting stratum 45 is composed of gold about 100 angstrom units thick. Liquid stratum 46 contains a mixture of p-alkoxybenzylidene-p'-amino-benzonitrile and an acyloxybenzylidene anil. Such a mixture is a diffuse white at room temperature so that ordinary photographic image stratum 48 is viewed directly in light that is diffusely reflected by liquid stratum 46. In this embodiment, application of about 30–60 volts AC across electrodes 52, 54 and conducting strata 44, 45 causes liquid crystal stratum 46 to clear so that, when print 40 is inserted into the gate, the print becomes a transparency. As a result, illuminating light is directed from lamp 56 via mirror 64 and field lens 60 to print 40 and imaging light is reflected from print 40 via field lens 60 and mirror 66 through objective lens 62 to a projection screen. When print 40 is removed from gate 52, 54, liquid crystal stratum 46 reverts to its scattering state so that print 40 once again can be viewed by diffusely reflected light.

Figure 5:
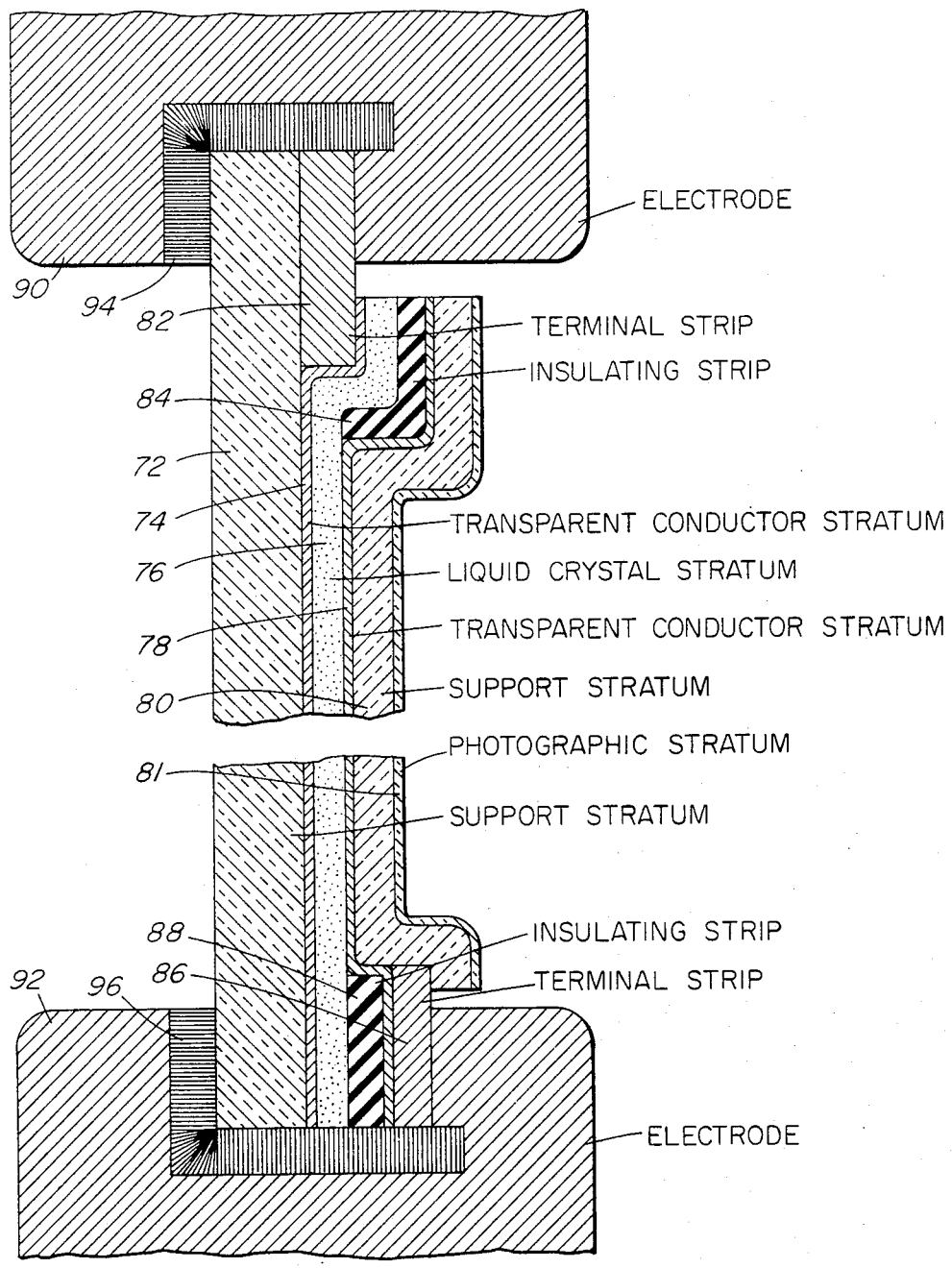
FIG. 5 is an enlarged, broken away detail view of the structures of the photographic products of FIGS. 1 and 3, and their interrelationship with components of the projection devices of FIGS. 2 and 4.

The Detailed Structure Of FIG. 5

The interconnection between the electrodes of FIGS. 2 and 4 and the electrically conducting strata of FIGS. 1 and 3 is shown in FIG. 5. Here, the photographic print is greatly enlarged to show a base support stratum at 72, a first electrically conducting stratum at 74, a liquid crystal stratum at 76, a second electrically conducting stratum at 78, a photographic support stratum at 80, and a photographic image stratum at 81. Typically, photographic support stratum 81 and base support stratum 72 are composed of the same or similar polymers. Photographic stratum 81 is composed of either photosensitive material capable of receiving a latent image or visual material resulting from the exposure and development of photosensitive material. Typically the thickness of photographic support stratum 80 ranges from 2 to 10 times the thickness of photographic stratum 81. As shown, a pair of electrically conducting terminal strips 82, 86, for example 0.1 mil thick, are positioned at the upper and lower edges of the photographic assemblage. Also positioned at the upper and lower edges of the photographic assemblage are a pair of electrically insulating strips 84, 88, which are interposed between electrically conducting strata 74, 78.

It will be observed that the upper and lower edges of base support 72 and upper and lower terminal strips 82, 86 extend beyond the upper and lower edges of photographic support stratum 80 and photographic image stratum 81. In consequence, upper and lower terminal strips 82, 86 are free for insertion into and removed from the channels of an upper electrode 90 and a lower electrode 92. While in these channels, terminal strip 82 is pressed mechanically into electrical contact with electrode 90 by a resilient felt lining 94 and terminal strip 86 is pressed mechanically into electrical contact with electrode 86 by a resilient felt lining 96. The edges of the assemblage, in the vicinity of liquid crystal stratum 76, are sealed by a suitable polymer, for example an epoxy cement or a rubber cement. Since both support strata 72, 80 are composed of thin plastic and since the overall thickness of the photographic assemblage is less than say 25 mils, the photographic assemblage is somewhat flexible so that it has the hand and feel of an ordinary photographic print. Slight deformation may distort the cross-sectional uniformity of liquid crystal stratum 76 so that clearing or clouding may not occur exactly simultaneously throughout the liquid crystal stratum. However, even a response delay as large as one second between various parts of the liquid crystal stratum is of no consequence in the present system, which accordingly is not critically dependent on extremely precise liquid crystal cross-sectional uniformity.

Figure 6:
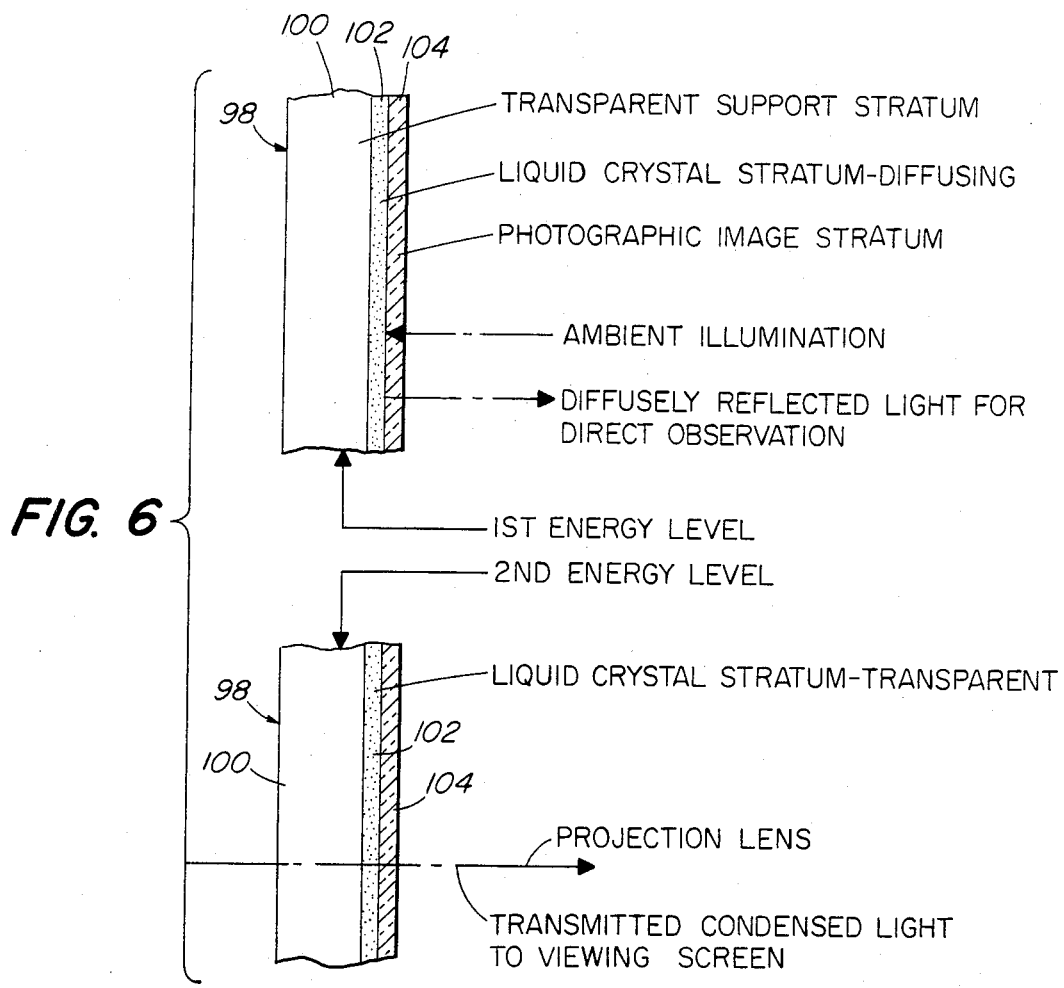
FIG. 6 illustrates in exaggerated cross section, the structure and operation of another photographic product that is adapted for both direct observation and episcopic projection.

The Processes And Products Of FIG. 6

In FIG. 6, photographic print 98 comprises, in laminated sequence, a transparent base stratum 100, a liquid crystal stratum 102 and a photographic image stratum 104, which correspond to their counterparts in FIGS. 1 and 5.

Figure 7:
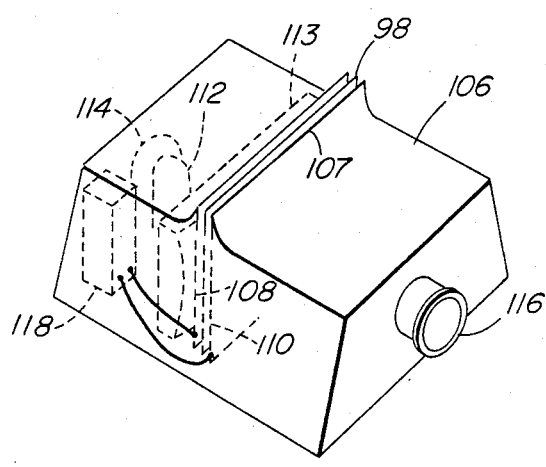
FIG. 7 illustrates a projection device adapted for use in the product of FIG. 6.

The System of FIG. 7

The projector of FIG. 7, includes a unitary housing 106 having a forward portion and a rearward portion that are medially separated by a projection gate 107. Photographic print 98 is removably inserted into projection gate 107 through an upper notch in housing 106. The operating components of the projector include a high intensity projection lamp 112 having a point incandescent source for generating visible illumination, a concave mirror 114 behind the point source, an aspheric condensing lens 113 between the point source and the projection gate, and a projection lens 116. Projection gate 107 is located between forward and rearward electrically conducting windows 110, 108, which control the energy level within projection gate 107 but which do not interfere with the transmission of illumination through the projection gate. In one form, windows 108, 110 are composed of glass that is coated with transparent strata of electrically conducting tin oxide. These electrically conducting strata are energized through suitable leads by a power supply and circuit control 118.

Specific structure and operation of the products and devices of FIGS. 1 and 2 are given in the following non-limiting example.

EXAMPLE 5

In an example of photographic print 98 of FIG. 6, as used in the projector of FIG. 7: support stratum 100 and photographic image stratum 104 correspond to their counterparts in Example 1. However, liquid crystal stratum 102 contains a microcrystalline wax, which is a diffuse white at room temperature so that ordinarily photographic image stratum 104 is viewed directly in light that is diffusely reflected by liquid stratum 102. In this embodiment gate 107 is maintained at a temperature of approximately 150° F. The coatings on windows 108, 110 are composed of colloidal graphite to provide heat to gate 107 by electrical resistance to current flow from power supply and circuit control 118. The microcrystalline wax of liquid crystal stratum 102 becomes transparent at approximately 150° F so that when print 98 is inserted into gate 107, print 98 becomes a transparency. As a result, illumination is projected from lamp 112, mirror 114 and condensing lens 113 through gate 107 and projection lens 116 to a viewing screen.

CONCLUSION

The present invention thus provides a variety of episcopic and diascopic techniques by which visual media, selectively may be observed as apparently conventional prints or projected as apparently conventional transparencies. Since certain changes may be made in the disclosure hereof without departing from the scope of the present invention, it is intended that all matter described in the foregoing specification or illustrated in the accompanying drawings, be interpreted in an illustrative and not in a limiting sense.

What is claimed is:

1. A photographic assemblage comprising, in laminated superposition:
   a. a photographic stratum composed of a photosensitive material;
   b. a liquid crystal stratum composed of a material selected from the class consisting of nematic materials, smectic materials, cholesteric materials and mixtures thereof, exhibiting a light scattering optical texture in response to a first voltage and a clear optical texture in response to a second voltage;
   c. a first electrically conducting stratum and a second electrically conducting stratum having a region interposed therebetween;
   d. said liquid crystal stratum being within said region between said first electrically conducting stratum and said second electrically conducting stratum;
   e. said photographic stratum being external of said region between said first electrically conductive stratum and said second electrically conductive stratum;
   f. said liquid crystal stratum being characterized substantially throughout by said light scattering texture as a function of said first voltage between said first electrically conductive stratum and said second electrically conductive stratum;
   g. said liquid crystal stratum being characterized substantially throughout by said clear optical texture as a function of said second voltage between said first electrically conductive stratum and said second electrically conductive stratum;
   h. one of said first electrically conductive stratum and said second electrically conductive stratum being interposed between said liquid crystal stratum and said photographic stratum and being optically clear;
   i. whereby, with said first voltage, said photographic stratum constitutes means for viewing in terms of light scattered from said liquid crystal stratum and, with said second voltage, said photographic stratum constitutes means for imaging in terms of light directed through said liquid crystal stratum.

2. The photographic assemblage of claim 1 wherein said first electrically conducting stratum and said second electrically conducting stratum are composed of metal.

3. The photographic assemblage of claim 1 wherein said liquid crystal stratum is composed of a mixture of cholesteric and nematic liquid crystal materials, said liquid crystal stratum assuming one of a focal conic texture and a Grandjean texture with one of said first voltage and said second voltage.

4. The photographic assemblage of claim 1 wherein said liquid crystal stratum is composed of a mixture of cholesteric and nematic liquid crystal materials, said liquid crystal stratum assuming a scattering cholesteric texture with said first voltage and a clear nematic texture with said second voltage.

5. The photographic assemblage of claim 1 wherein said first electrically conducting stratum and said second electrically conducting stratum are composed of at least one noble metal that is sufficiently thin to be substantially transparent.

6. The photographic assemblage of claim 1 wherein said liquid crystal stratum is composed of a mixture of N-(p-methoxybenzylidene)-p-butylaniline and cholesteryl oleyl carbonate.

7. The photographic assemblage of claim 1 wherein said liquid crystal stratum is composed of a mixture of an asymetric, optically active, p-alkoxybenzylidene-p'-amino-benzonitrile, and (b) a dielectrically positive, anisotropic member of the class consisting of alkoxy- and acyloxybenzilidene anils.

8. A photographic assemblage comprising, in laminated superposition:
   a. a photographic stratum composed of a photosensitive material;
   b. a liquid crystal stratum composed of a material selected from the class consisting of nematic materials, smectic materials, cholesteric materials and mixtures thereof, exhibiting a light scattering optical texture in response to a first voltage and a clear optical texture in response to a second voltage;
   c. a first electrically conducting stratum and a second electrically conducting stratum having a region interposed therebetween;
   d. said liquid crystal stratum being within said region between said first electrically conducting stratum and said second electrically conducting stratum;
   e. said photographic stratum being external of said region between said first electrically conductive stratum and said second electrically conductive stratum;

f. said liquid crystal stratum being characterized substantially throughout by said light scattering texture as a function of said first voltage between said first electrically conductive stratum and said second electrically conductive stratum;

g. said liquid crystal stratum being characterized substantially throughout by said optically clear texture as a function of said second voltage between said first electrically conductive stratum and said second electrically conductive stratum;

h. one of said first electrically conductive stratum and said second electrically conductive stratum being interposed between said liquid crystal stratum and said photographic stratum and being optically clear;

i. first electrode means contacting said first electrically conducting stratum;

j. second electrode means contacting said second electrically conducting stratum;

k. said first electrode means and said second electrode means being accessible externally of said photographic assemblage;

l. whereby with said first voltage, said photographic stratum constitutes means for viewing in terms of light scattered from said liquid crystal stratum and, with said second voltage, said photographic stratum constitutes means for imaging in terms of light directed through said liquid crystal stratum.

9. The photographic assemblage of claim 8 wherein said first electrically conducting stratum and said second electrically conducting stratum are composed of metal.

10. The photographic assemblage of claim 9 wherein said first electrically conducting stratum and said second electrically conducting stratum are composed of at least one noble metal that is sufficiently thin to be substantially transparent.

11. The photographic assemblage of claim 9 wherein said liquid crystal stratum is composed of a mixture of N-(p-methoxybenzylidene)-p-butylaniline and cholesteryl oleyl carbonate.

12. The photographic assemblage of claim 9 wherein said liquid crystal stratum is composed of a mixture of (a) an asymmetric, optically active, p-alkoxybenzylidene-p'-amino-benzonitrile, and (b) a dielectrically positive, anisotropic member of the class consisting of alkoxy-and acyloxybenzilidene anils.

13. The photographic assemblage of claim 9 wherein each of said first electrically conducting stratum and said second electrically conducting stratum is no more than 300 angstrom units thick.

14. The photographic assemblage of claim 9 wherein each of said electrodes is thicker than each of said first electrically conducting stratum and said second electrically conducting stratum.

15. The photographic assemblage of claim 8 wherein said liquid crystal stratum is composed of a mixture of cholesteric and nematic liquid crystal materials, said liquid crystal stratum assuming one of a focal conic texture and a Grandjean texture at one of said first voltage and said second voltage.

16. The photographic assemblage of claim 8 wherein said liquid crystal stratum is composed of a mixture of cholesteric and nematic liquid crystal materials, said liquid crystal stratum assuming a scattering cholesteric state at said first voltage and a clear nematic state at said second voltage.

17. Photographic assemblage means for presenting a stack of superposed components in a photographic frame, said components comprising:

a. photographic stratum means for optical registration in said stack and composed of a photosensitive material;

b. liquid crystal stratum means for optical registration in said stack and composed of a material selected from the class consisting of nematic materials, smectic materials, cholesteric materials and mixtures thereof, exhibiting a light scattering optical texture in response to a first voltage condition and a light transmitting optical texture in response to a second voltage condition;

c. first electrode stratum means for optical registration in said stack;

d. second electrode stratum means for optical registration in said stack;

e. said liquid crystal stratum means being located for operation between said first electrode stratum means and said second electrode stratum means;

f. one of said first electrode stratum means and said second electrode stratum means being located for operation between said liquid crystal stratum means and said photographic stratum means and being optically clear;

g. said liquid crystal stratum means constituting a background when said material thereof exhibits said light scattering optical texture and constituting a window when said material thereof exhibits said light transmitting optical texture;

h. said background being constituted as a function of said first voltage condition between said first electrode stratum means and said second electrode stratum means;

i. said window being constituted as a function of said second voltage condition between said first electrode stratum means and said second electrode stratum means;

j. whereby, when said liquid crystal stratum means is in said first voltage condition, said photographic stratum means establishes viewing in terms of light directed through said photographic stratum means and scattered from said liquid crystal stratum means and, when said liquid crystal stratum means is in said second voltage condition, said photographic stratum means establishes imaging in terms of light directed through said photographic stratum means and through said liquid crystal stratum means.

18. The photographic assemblage of claim 17 wherein said photosensitive material is silver containing.

19. The photographic assemblage of claim 17 wherein said photosensitive material is silver halide.

20. The photographic assemblage of claim 17 wherein the other of said first electrode stratum means and said second electrode stratum means is optically clear.

21. The photographic assemblage of claim 17 wherein the other of said first electrode stratum means and said second electrode stratum means is specularly reflecting.

22. A photographic assemblage comprising, in laminated sequence;

a. a polymeric support stratum;

b. a first electrode stratum;
c. a liquid crystal stratum containing a mixture of nematic material and cholesteric material, exhibiting a scattering optical texture under at least one voltage condition and a clear texture under at least another voltage condition;
d. a second electrode stratum;
e. a polymeric support stratum; and
f. a photographic stratum composed of a photosensitive material.

23. The photographic assemblage of claim 22 wherein said first electrode stratum and said second electrode stratum are composed of metal.

24. The photographic assemblage of claim 22 wherein said photosensitive material is silver containing.

25. A photographic assemblage comprising, in laminated superposition;
a. a photographic stratum incorporating a photograph;
b. a liquid crystal stratum composed of a material selected from the class consisting of nematic materials, smectic materials, cholesteric materials and mixtures thereof, exhibiting a light scattering optical texture in response to a first voltage and a clear optical texture in response to a second voltage;
c. a first electrically conducting stratum and a second electrically conducting stratum having a region interposed therebetween;
d. said liquid crystal stratum being within said region between said first electrically conducting stratum and said second electrically conducting stratum;
e. said photographic stratum being external of said region between said first electrically conductive stratum and said second electrically conductive stratum;
f. said liquid crystal stratum being characterized substantially throughout by said light scattering texture as a function of said first voltage between said first electrically conductive stratum and said second electrically conductive stratum;
g. said liquid crystal stratum being characterized substantially throughout by said clear optical texture as a function of said second voltage between said first electrically conductive stratum and said second electrically conductive stratum;
h. one of said first electrically conductive stratum and said second electrically conductive stratum being interposed between said liquid crystal stratum and said photographic stratum and being optically clear;
i. whereby, with said first voltage, said photographic stratum constitutes means for viewing in terms of light scattered from said liquid crystal stratum and with said second voltage, said photographic stratum constitutes means for imaging in terms of light directed through said liquid crystal stratum.

26. The photographic assemblage of claim 25 wherein said first electrically conducting stratum and said second electrically conducting stratum are composed of metal.

27. The photographic assemblage of claim 25 wherein said material of said liquid crystal stratum is composed of a mixture of cholesteric and nematic liquid crystal materials, said liquid crystal stratum assuming one of a focal conic texture and a Grandjean texture with one of said first voltage and said second voltage.

28. The photographic assemblage of claim 25 wherein said material of said liquid crystal stratum is composed of a mixture of cholesteric and nematic liquid crystal materials, said liquid crystal stratum assuming a scattering cholesteric state with said first voltage and a clear nematic state with said second voltage.

29. The photographic assemblage of claim 25 wherein said first electrically conducting stratum and said second electrically conducting stratum are composed of at least one noble metal that is sufficiently thin to be substantially transparent.

30. The photographic assemblage of claim 25 wherein said liquid crystal stratum is composed of a mixture of N-(p-methoxybenzylidene)p-butylanidine and cholesteryl oleyl carbonate.

31. The photographic assemblage of claim 25 wherein said liquid crystal stratum is composed of a mixture of (a) an asymetric, optically active, p-alkoxybenzylidene-p'-amino-benzonitrile, and (b) a dielectrically positive, anisotropic member of the class consisting of alkoxy-and acyloxybenzilidene anils.

32. A photographic assemblage comprising, in laminated superposition:
a. a photographic stratum incorporating a photograph;
b. a liquid crystal stratum composed of a material selected from the class consisting of nematic materials, smectic materials, cholesteric materials and mixtures thereof, exhibiting a light scattering optical texture in response to a first voltage and a clear optical texture in response to a second voltage;
c. a first electrically conducting stratum and a second electrically conducting stratum having a region interposed therebetween;
d. said liquid crystal stratum being within said region between said first electrically conducting stratum and said second electrically conducting stratum;
e. said photographic stratum being external of said region between said first electrically conductive stratum and said second electrically conductive stratum;
f. said liquid crystal stratum being characterized substantially throughout by said light scattering texture as a function of said first voltage between said first electrically conductive stratum and said second electrically conductive stratum;
g. said liquid crystal stratum being characterized substantially throughout by said optically clear texture as a function of said second voltage between said first electrically conductive stratum and said second electrically conductive stratum;
h. one of said first electrically conductive stratum and said second electrically conductive stratum being interposed between said liquid crystal stratum and said photographic stratum and being optically clear;
i. first electrode means contacting said first electrically conducting stratum;
j. second electrode means contacting said second electrically conducting stratum;
k. said first electrode means and said second electrode means being accessible externally of said photographic assemblage;
l. whereby, with said first voltage, said photographic stratum constitutes means for viewing in terms of light scattered from said liquid crystal stratum and, with said second voltage, said photographic stratum constitutes means for imaging in terms of light directed through said liquid crystal stratum.

33. The photographic assemblage of claim 32 wherein said first electrically conducting stratum and said second electrically conducting stratum are composed of metal.

34. The photographic assemblage of claim 32 wherein said liquid crystal stratum is composed of a mixture of cholesteric and nematic liquid crystal materials, said liquid crystal stratum assuming one of a focal conic texture and a Grandjean texture with one of said first voltage and said second voltage.

35. The photographic assemblage of claim 32 wherein said liquid crystal stratum is composed of a mixture of cholesteric and nematic liquid crystal materials, said liquid crystal stratum assuming a scattering cholesteric state at said first voltage and a clear nematic state at said second voltage.

36. The photographic assemblage of claim 32 wherein said first electrically conducting stratum and said second electrically conducting stratum are composed of at least one noble metal that is sufficiently thin to be substantially transparent.

37. The photographic assemblage of claim 32 wherein said liquid crystal stratum is composed of a mixture of N-(p-methoxybenzylidene)-p-butylaniline and cholesteryl oleyl carbonate.

38. The photographic assemblage of claim 32 wherein said liquid crystal stratum is composed of a mixture of (a) an asymetric, optically acitve, p-alkoxybenzylidene-p'-amino-benzonitrile, and (b) a dielectrically positive, anisotropic member of the class consisting of alkoxy-and acyloxybenzilidene anils.

39. The photographic assemblage of claim 32 wherein each of said first electrically conducting stratum and said second electrically conducting stratum is no more than 300 angstrom units thick.

40. The photographic assemblage of claim 32 wherein each of said electrodes is thicker than each of said first electrically conducting stratum and said second electrically conducting stratum.

41. Photographic assemblage means for presenting a stack of superposed components in a photographic frame, said components comprising:
 a. photographic stratum means for optical registration in said stack and incorporating photograph means;
 b. liquid crystal stratum means for optical registration in said stack and composed of a material selected from the class consisting of nematic materials, smectic materials, cholesteric materials and mixtures thereof, exhibiting a light scattering optical texture in response to a first voltage condition and a light transmitting optical texture in response to a second voltage condition;
 c. first electrode stratum means for optical registration in said stack;
 d. second electrode stratum means for optical registration in said stack;
 e. said liquid crystal stratum means being located for operation between said first electrode stratum means and said second electrode stratum means;
 f. one of said first electrode stratum means and said second electrode stratum means being located for operation between said liquid crystal stratum means and said photographic stratum means and being optically clear;
 g. said liquid crystal stratum means constituting a background when said material thereof exhibits said light scattering optical texture and constituting a window when said material thereof exhibits said light transmitting optical texture;
 h. said background being constituted as a function of said first voltage condition between said first electrode stratum means and said second electrode stratum means;
 i. said window being constituted as a function of said second voltage condition between said first electrode stratum means and said second electrode stratum means;
 j. whereby, when said liquid crystal stratum means is in said first voltage condition, said photographic stratum means establishes viewing in terms of light directed through said photographic stratum means and scattered from said liquid crystal stratum means and, when said liquid crystal stratum means is in said second voltage condition, said photographic stratum means establishes imaging in terms of light directed through said photographic stratum means and through said liquid crystal stratum means.

42. The photographic assemblage of claim 41 wherein said photographic means is silver containing.

43. The photographic assemblage of claim 41 wherein said photographic means is exposed and developed silver halide.

44. The photographic assemblage of claim 41 wherein the other of said first electrode stratum means and said second electrode stratum means is optically clear.

45. The photographic assemblage of claim 41 wherein the other of said first electrode stratum means and said second electrode stratum means if specularly reflecting.

46. A photographic assemblage comprising, in laminated sequence:
 a. a polymeric support stratum;
 b. a first electrode stratum;
 c. a liquid crystal stratum containing a mixture of nematic material and cholesteric material exhibiting a scattering optical texture under at least one voltage condition and a clear optical texture under at least another voltage condition;
 d. a second electrode stratum;
 e. a polymeric support stratum; and
 f. a photographic stratum incorporating a photograph.

47. The photographic assemblage of claim 46 wherein said first electrode stratum and said second electrode stratum are composed of metal.

48. The photographic assemblage of claim 46 wherein said photographic is silver containing.

* * * * *